Oct. 17, 1961 — J. E. ULLMAN — 3,004,479
APPARATUS AND METHOD OF MAKING A LUG BOX
Filed March 29, 1960 — 6 Sheets-Sheet 1

Fig. 1

INVENTOR.
JOHN E. ULLMAN
BY John F. A. Earley, Jr.
ATTORNEY.

Oct. 17, 1961 J. E. ULLMAN 3,004,479
APPARATUS AND METHOD OF MAKING A LUG BOX
Filed March 29, 1960 6 Sheets-Sheet 4

INVENTOR.
JOHN E. ULLMAN
BY John F. A. Earley, Jr.
ATTORNEY.

Oct. 17, 1961  J. E. ULLMAN  3,004,479
APPARATUS AND METHOD OF MAKING A LUG BOX
Filed March 29, 1960  6 Sheets-Sheet 5

INVENTOR.
JOHN E. ULLMAN
BY
*John F. A. Earley, Jr.*
ATTORNEY.

Oct. 17, 1961  J. E. ULLMAN  3,004,479
APPARATUS AND METHOD OF MAKING A LUG BOX
Filed March 29, 1960 6 Sheets-Sheet 6

INVENTOR.
JOHN E. ULLMAN
BY
ATTORNEY.

United States Patent Office 3,004,479
Patented Oct. 17, 1961

3,004,479
APPARATUS AND METHOD OF MAKING
A LUG BOX
John E. Ullman, Drexel Hill, Pa., assignor to Huntingdon Industries Incorporated, Bethayres, Pa., a corporation of Pennsylvania
Filed Mar. 29, 1960, Ser. No. 18,373
16 Claims. (Cl. 93—55)

This invention relates to improvements in apparatus and method of manufacturing a lug box, and more particularly concerns a machine and method for making a lug box having bottom, side, front, and rear walls made of paper, and side support walls made of wooden boards attached to the interior of the side walls.

Fruit and produce such as grapes, avocados, and tomatoes were formerly packed and shipped in wooden trays. Such trays had several disadvantages among which was high cost. Accordingly, it has been suggested to replace the wooden trays with a lug box which is made of paper (by "paper" is meant corrugated paper board, cardboard, or the like, such as is used in making various types of cartons), and is provided with side support walls made of wooden boards which are usually of greater height than the paper side walls of the carton to which they are adhesively attached.

Accordingly, it is an object of this invention to provide apparatus and method for making such a lug box.

It is another object of this invention to provide lug box making apparatus and method which are efficient, safe, fast, and economical. Other objects and advantages of this invention, including its simplicity, will further become apparent hereinafter and in the drawings, in which:

Although specific terms are used in the following description for clarity, these terms are intended to refer only to the structure shown in the drawings and are not intended to define or limit the scope of the invention.

Figures 12, 13:
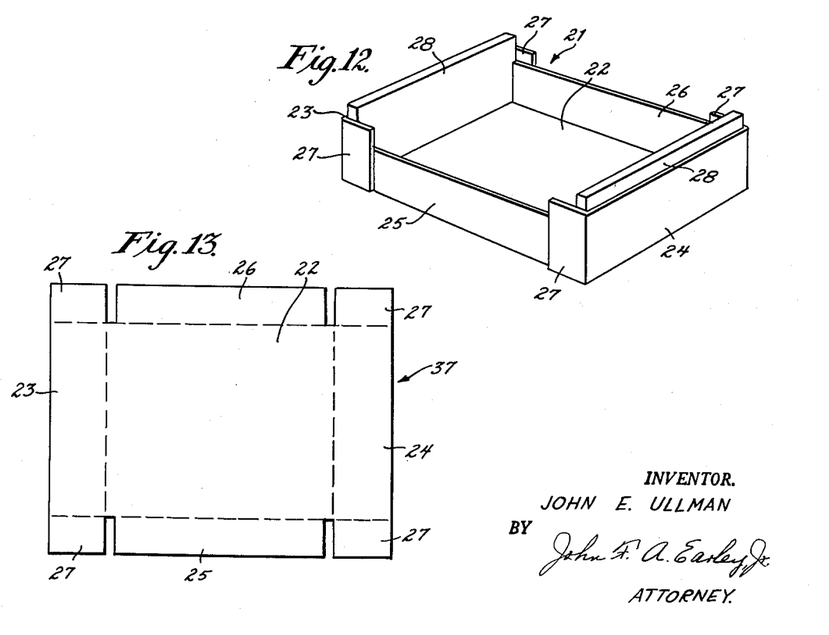
FIG. 12 is a view in perspective of a lug box.
FIG. 13 is a view of a lug box paper blank.

Turning now to the specific embodiment of the invention selected for illustration in the drawings, there is shown (FIG. 12) a lug box 21 having paper bottom wall 22, side walls 23, 24, front wall 25, rear wall 26, and connecting tabs 27 extending from side walls 23, 24. Giving strength to box 21 are the support walls which are made of wooden boards 28 which are (if desired) greater in height than the height of the side walls 23, 24 so as to allow for easier stacking of the lug boxes 21.

Figure 1:
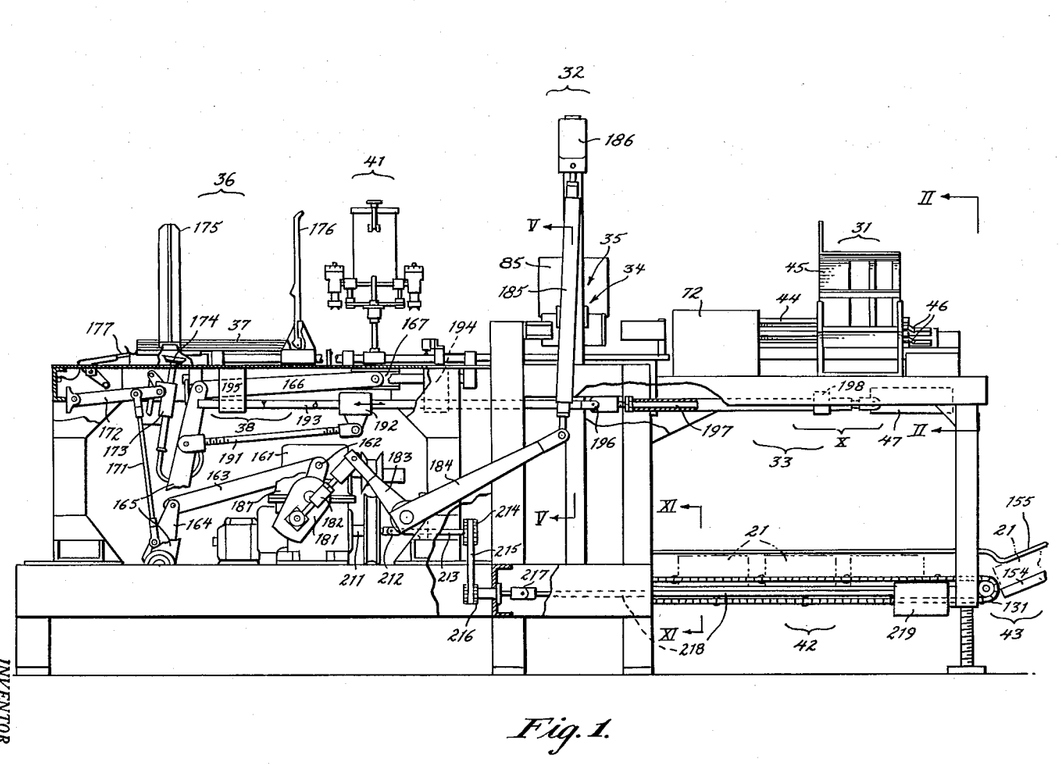
FIG. 1 is a view in side elevation of a lug box making machine constructed in accordance with this invention.

Referring to FIG. 1, there is shown a lug box making machine constructed in accordance with this invention, comprising board hopper means 31 for holding a quantity of the wooden boards 28, a forming station 32 where the elements of the lug box 21 are formed into set-up condition, board feed means 33 for feeding a pair of boards 28 from board hopper means 31 to forming station 32, board receiving means 34 positioned at forming station 32 for receiving and detachably holding the pair of boards 28, heating means 35 mounted on board receiving means 34 for drying the surface of boards 28, a paper hopper 36 for holding a quantity of paper blanks 37 in flat condition, paper feed means 38 for feeding the paper blanks 37 from the paper hopper 36 to the forming station 32 and into position beneath the pair of boards 28 as they are detachably held by board receiving means 34, adhesive applying means 41 (preferably spray means, as shown) positioned intermediate paper hopper 36 and forming station 32 for applying an adhesive to selected areas of paper blank 37, and means positioned at forming station 32 for placing the boards 28 onto paper blank 37, for camming walls 23—26 and tabs 27 of lug box 21 into set-up position, and for compressing the adhesive surfaces of the box 21 together to aid in setting.

Positioned below forming station 32 and extending rearwardly below board hopper means 31 is conveyor means 42 which receives the formed lug box 21 from forming station 32 and transports it to a delivery station 43.

Figure 2:
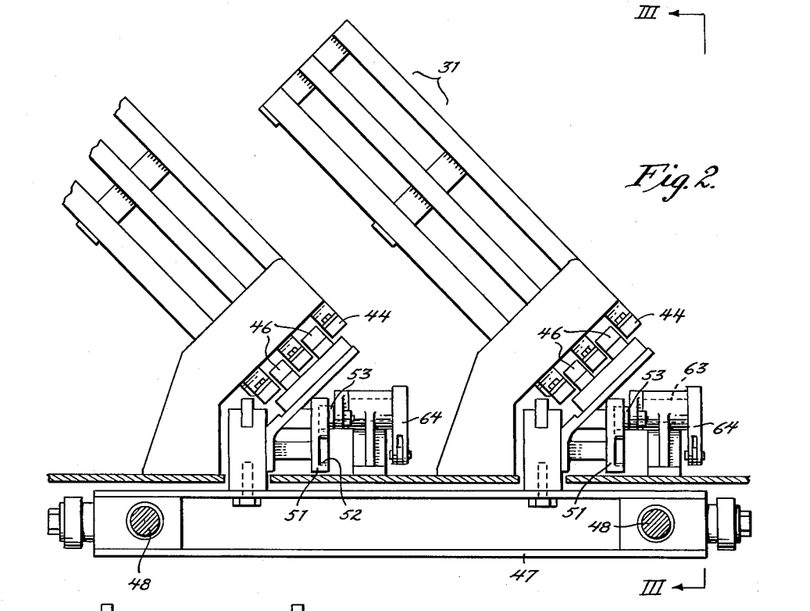
FIG. 2 is a view in end elevation taken as indicated by the lines and arrows II—II which appear in FIG. 1.
Figure 3:
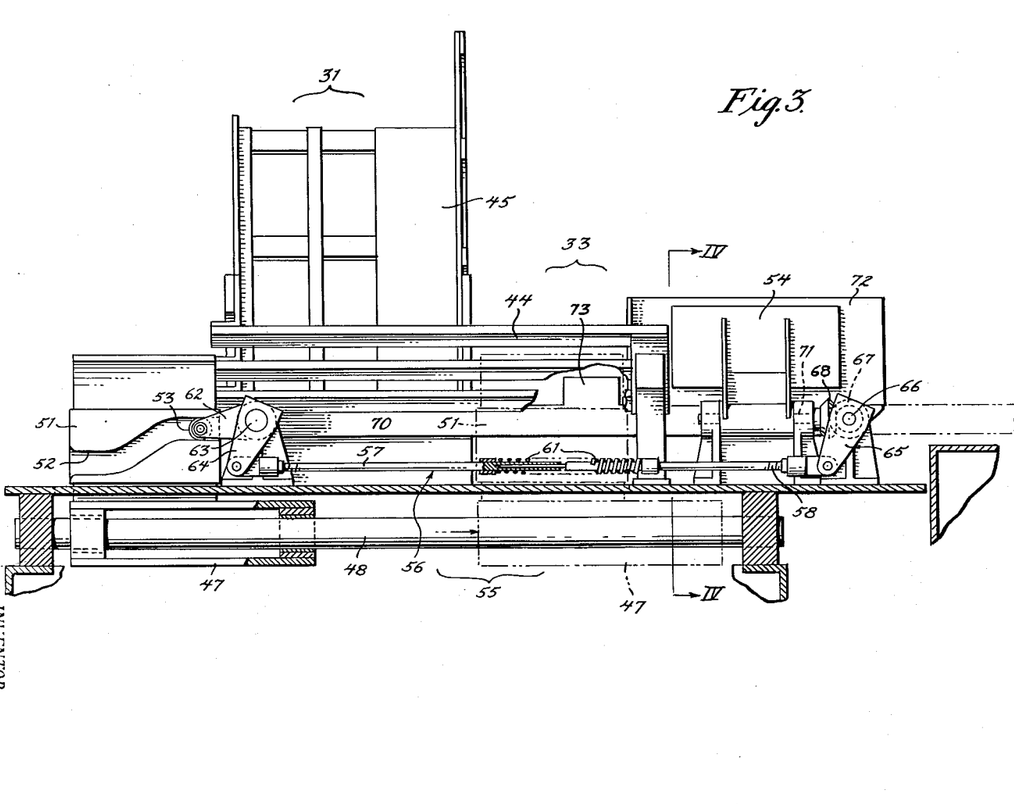
FIG. 3 is a view in side elevation of a hopper for wooden boards which forms an element of this invention, taken as indicated by the lines and arrows III—III which appear in FIG. 2.
Figure 4:
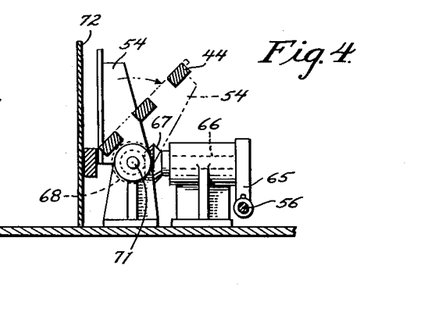
FIG. 4 is a view in section taken as indicated by the lines and arrows IV—IV which appear in FIG. 3.

Referring now more particularly to FIGS. 2-4, there is shown in greater detail the board hopper means 31 and the board feed means 33.

Board hopper means 31 includes slotted bottom board support 44 which slants upwardly from the horizontal, and side board support 45 which is positioned at substantially right angles to bottom board support 44. This arrangement of board supports 44, 45 delivers the boards 28 down an inclined plane formed by side board support 45 so that only a portion of the weight of a stack of boards 28 rests on bottom board support 44, the rest of the weight of the stack of boards 28 being supported by side board support 45.

Board feed means 33 includes feed pusher fingers 46 which extend into the slots of bottom board support 44 to contact the bottom board 28 therein, crosshead 47 which is reciprocably mounted beneath board hopper means 31 on stationary rods 48, and cam block 51 mounted on crosshead 47 and movable therewith. Pusher fingers 46 extend from cam block 51 and push the board 28 which is on the bottom of hopper means 31 towards forming station 32.

Cam block 51 has formed therein a cam surface or slot 52. Cam follower 53 is mounted in operative relationship with cam surface 52.

A hinged flapper plate 54 is positioned intermediate board hopper means 31 and forming station 32 and acts to erect board 28 to upright position during its travel toward forming station 32.

Connecting means 55 serves to connect cam follower 53 and flapper plate 54, and includes a telescoping rod 56 having a cam end portion 57 and a flapper plate end portion 58. A tension spring 61 joins the two end portions 57, 58 together so that if a board 28 should jam to prevent movement of flapper plate end portion 58, cam end portion 57 moves against the action of tension spring 61. This arrangement protects the elements of the machine from the damage which would otherwise result from the jamming of board 28.

The full lines in FIG. 3 show crosshead 47 at the start end of its board-delivering stroke, and the dot-dash lines show crosshead 47 at the finish end of its stroke.

In operation of board feed means 33, the forward movement of cam block 51 causes cam follower 53 to move downwardly as it follows cam surface 52. This movement rotates rocker arm 62, shaft 63, and rocker arm 64 to move rod 57 forwardly. This movement of rod 57 turns rocker arm 65, shaft 66, gear 67, and gear 68 which turns shaft 71 to rotate flapper plate 54 outwardly away from guide plate 72.

Board feed means 33 then delivers board 28 to flapper plate 54, and board 28 rests thereon in a position inclined upwardly from the horizontal. On its return stroke (and during the last portion of same), cam block 51 raises cam follower 53, and this action causes flapper plate 54 to rotate inwardly to deposit board 28 in an upright position against guide 72. Pusher finger 73 (mounted on the end of bayonet 70 which extends from cam block 51) moves board 28 forwardly toward forming station 32 on the next stroke of board feed means 33.

Figure 5:
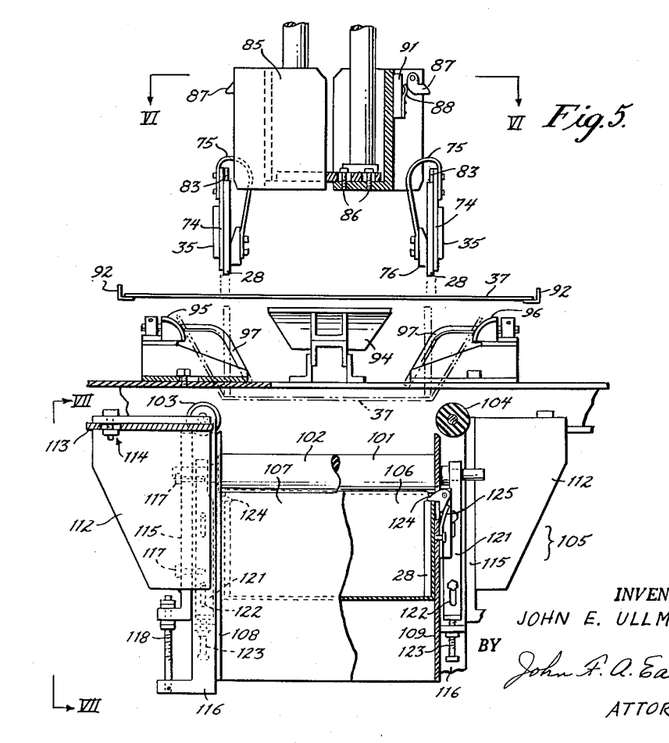
FIG. 5 is a view in section taken as indicated by the lines and arrows V—V which appear in FIG. 1.
Figure 6:
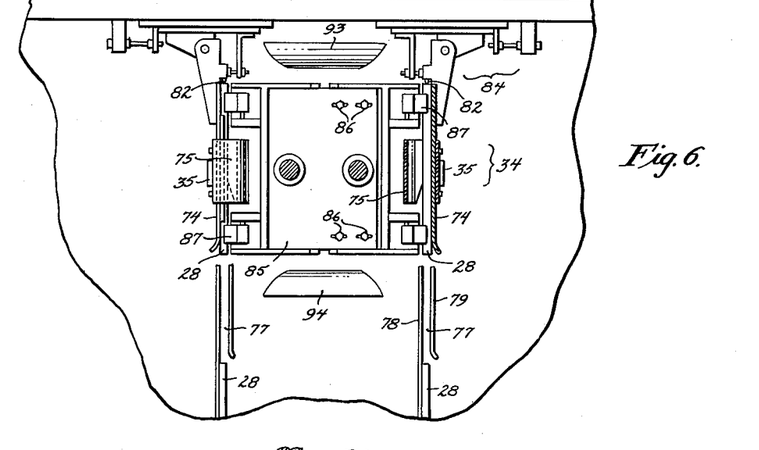
FIG. 6 is a view in horizontal section taken as indicated by the lines and arrows VI—VI which appear in FIG. 5.

Referring now more particularly to FIGS. 5 and 6, board receiving means 34 includes adjustably positioned board holding plates 74, and adjustably positioned spring clips 75 having free end portions 76 which detachably hold a pair of boards 28 against the plates 74. Leading into board holding plates 74 and spring clips 75 are entrance guideways 77 formed by guide plates 78, 79.

Adjustable spring-backed stops 82 are mounted on the far side of spring clips 75 and board holding plates 74 for properly positioning the pair of boards 28 in the horizontal sense, and adjustable guides 83 are mounted on board holding plates 74 above boards 28 for properly positioning the boards in the vertical sense.

It is to be noted that adjustable means 84 serves to adjustably position the board holding plates 74, that bolt and slot means adjustably position guides 83, and that adjustable means also position guide plates 78, 79 of entrance guideways 77.

Heating means 35 is preferably a heating unit of the electrical resistance type.

Forming station 32 contains a vertically reciprocable mandrel 85 which is adjustable as to size to accommodate various sizes of lug boxes 21, this adjustability as to size being accomplished by use of the bolt and slot means 86.

Board-stripper dogs 87 are mounted on the sides of mandrel 85 and operate to contact boards 28 and carry them downwardly from their position in receiving means 34. Dogs 87 are provided with springs 88 mounted on blocks 91 which may be moved upwardly and downwardly to accommodate various heights of boards 28.

Forming station 32 also includes paper guide channels 92 which position the paper blank 37 beneath boards 28 and mandrel 85. Front forming shoe 93, rear forming shoe 94, and side forming shoes 95, 96 are provided for camming the front, rear, and side walls 23—26 of lug box 21, and forming rods 97 are provided for camming connecting tabs 27 into set-up position.

The surfaces of paper blank 37 which contact boards 28 (the inside surface of side walls 23, 24), and the inside surface of tabs 27, have been coated with glue (preferably sprayed) at glue station 41. Walls 23—26 and connecting tabs 27 having been cammed into set-up condition by shoes 93—96 and forming rods 97, mandrel 85 carries box 21 between front roller 101, rear roller 102, and between side rollers 103, 104 to squeeze the adhesive portions of lug box 21 together to aid in setting.

As a further aid in setting the adhesive beneath rollers 101—104, a cage 105 is provided which includes front cage plate 106, rear cage plate 107, and side cage plates 108, 109. Cage plates 106—109 press against the walls 23—26 of the formed lug box 21 and prevent the walls from flowering outwardly while the adhesive is setting.

The position of the rollers 101—104 is adjustable to accommodate various sizes of lug boxes 21. The position of side rollers 103, 104 may be adjusted relative to front and rear rollers 101, 102, or the position of the rollers relative to the frame of the machine may be changed without disturbing the distance between rollers.

Cage support plate 112 is mounted on frame 113 and is adjustable horizontally by means of bolt and slot arrangement 114. Cage support plate 112 is provided with a flange 115 on which is mounted a roller support bracket 116 which supports side roller 103. Roller support bracket 116 is vertically adjustable with respect to cage support plate 112 through the use of bolt and slot arrangement 117 and threaded rod and nut arrangement 118.

Roller support bracket 121 supports rear roller 102, and is mounted on roller support bracket 116. Vertical adjustability between bracket 121 and bracket 116 is accomplished by providing bolt and slot arrangement 122 and threaded rod and nut arrangement 123. Accordingly, rear roller 102 may be moved relative to side roller 103 by moving roller support bracket 121 vertically with respect to roller support bracket 116. On the other hand, if it is desired to move rear roller 102 and side roller 103 without changing the distance between them, roller support bracket 116 is moved relative to cage support bracket 112. Side roller 104 and front roller 101 are provided with similar support brackets.

Box-stripper dogs 124 are mounted beneath the rollers and are provided with springs 125. When mandrel 85 travels downwardly, dogs 124 are pushed out of the way against the action of springs 125. The mandrel 85 with a formed lug box 21 thereon travels past the position of box-stripper dogs 124 and the stripper dogs 124 rotate outwardly to a position adjacent the surface of the mandrel. When mandrel 85 reverses to travel upwardly, it tends to bring the formed lug box 21 upwardly with it. However, the dogs 124 contact the top of the boards 28 to hold box 21 and strip it from mandrel 85.

A formed box 21 remains at the position of dogs 124 until succeeding boxes push it progressively downward and out of cage 105 by succeeding boxes.

Figure 7:
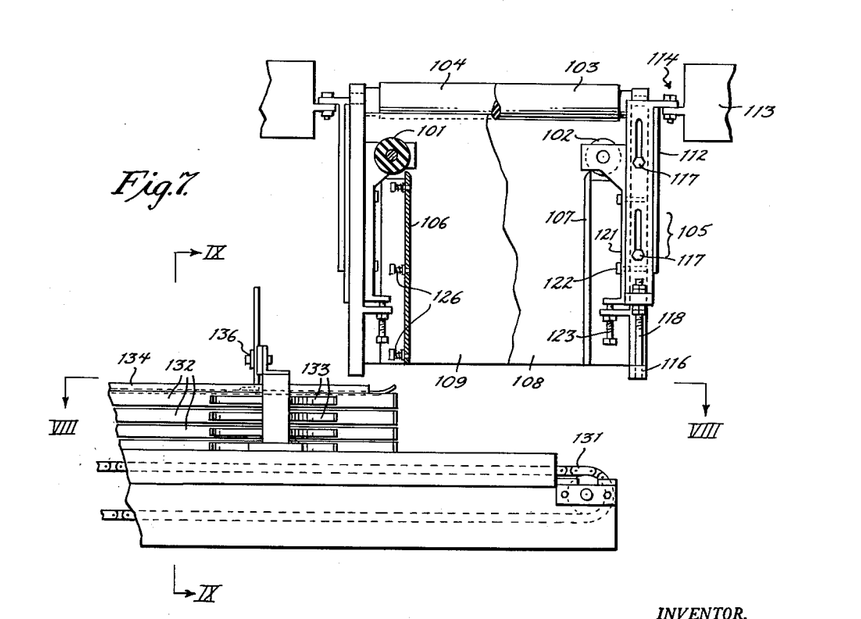
FIG. 7 is a view in side elevation and partly in section taken as indicated by the lines and arrows VII—VII which appear in FIG. 5.
Figure 8:
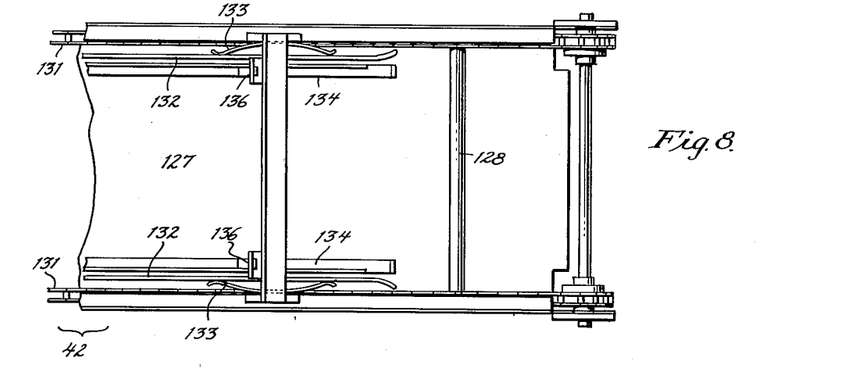
FIG. 8 is a view in horizontal taken as indicated by the lines and arrows VIII—VIII which appear in FIG. 7.
Figure 9:
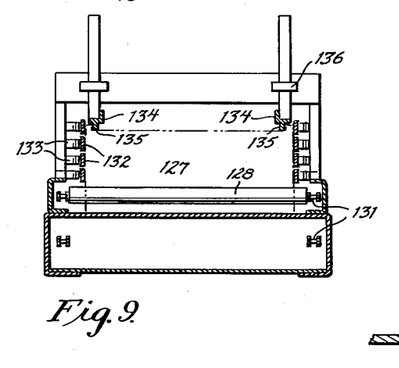
FIG. 9 is a view in section taken as indicated by the lines and arrows IX—IX which appear in FIG. 7.

Referring now more particularly to FIGS. 7–9, there is shown conveyor means 42 which is positioned beneath cage 105. It is to be noted that the cage plates 106—109 are provided with springs 126 which push the cage plates (for example, front cage plate 106 in FIG. 7) forwardly against the sides of the box 21.

Conveyor means 42 includes a conveyor passageway 127 through which the boxes 21 are transported and moved along by conveyor pusher bars 128 which travel with conveyor chains 131.

Side conveyor guides 132 press against the outside of side walls 23, 24, and are urged against side walls 23, 24 by springs 133 during the travel of lug boxes 21 through conveyor means 42.

Board conveyor guides 134 are mounted above conveyor passageway 127 and press downwardly on the top of boards 28 against the upward pressure exerted on lug box 21 by conveyor pusher bar 128. Guides 134 have a depending flange 135 which contacts the inner surface of boards 28 in opposition to the inward pressure exerted on boards 28 by side conveyor guides 132. Conveyor guides 134 are vertically adjustable in brackets 136 so as to accommodate lug boxes of various sizes.

Conveyor passageway 127 must be properly positioned vertically beneath cage 105 in order to receive the lug boxes 21 as they emerge from cage 105. Unless conveyor passageway 127 is positioned at the correct height for the size of lug box 21 being manufactured, the bottom of the lug box as it emerges from cage 105 will be too high for proper contact by the conveyor pusher bar 128, or will be too low so as to push downwardly against conveyor means 42 and jam the mechanism.

Means for vertically adjusting conveyor means 42 is provided which includes conveyor support bar 141 having flanges 142 that are supported by collars 143 of compression springs 144. Compression springs 144 are mounted on screws (or threaded rods) 145 between two adjustable stops 146, 147.

Springs 144 are pre-loaded to support conveyor support bar 141 without further deflection of the springs, and provide a safety feature whereby when conveyor means 42 is too close to cage 105 so that the emerging lug box 21 presses downwardly against the conveyor means to jam the mechanism, the springs 144 compress further to prevent damage to the apparatus. A limit switch may be mounted in operative relationship to conveyor support bar 141, and actuated thereby to operate electrical circuitry which shuts down the machine when conveyor support bar 141 is depressed to a predetermined extent.

To raise or lower conveyor support bar 141, gears 151 are mounted on top of screws 145 to mesh with gears 152 on a shaft 153. By rotating shaft 153, screws 145 are rotated and adjustable stops 146 are raised or lowered as desired. Stops 146 are constrained from rotation and are free to move only vertically.

Referring to FIG. 1, delivery station 43 is provided with a discharge chute 154 and discharge springs 155 which prevent the lug box 21 from sliding back to be caught under one of the following pusher bars 128 to be crushed thereby.

Drive means for the lug box making machine includes (FIG. 1): paper feed drive means for moving the paper blanks 37 from paper hopper 36 to forming station 32, paper transfer drive means for transferring the paper blanks 37 from paper hopper 36 to the paper feed drive means, mandrel drive means for reciprocating mandrel 85, board feed drive means for moving boards 28 from board hopper means 31 to forming station 32, and conveyor drive means for delivering the formed lug boxes from forming station 32 to delivery station 43.

The paper feed drive means includes drive motor 161, gear box 187, crank 162, connecting link 163, levers 164, 165, link 166, and paper-feed crosshead 167 which reciprocates back and forth to deliver blanks 37 from paper hopper 36 to forming station 32.

The paper transfer drive means includes drive motor 161, gear box 187, crank 162, connecting link 163, lever 164, link 171, lever 172, vacuum rod support mounting 173, and vacuum cup 174 which contacts the bottom blank 37 in hopper 36 to transfer it from the hopper to the paper feed means.

Paper hopper 36 includes stack guides 175, 176. To the rear of paper hopper 36 are mounted paper hold down means 177.

The mandrel drive means includes drive motor 161, gear box 187, adjustable crank plate 181, adjustable connecting rod 182, levers 183, 184, connecting rod 185, and mandrel crosshead 186.

The board feed drive means includes drive motor 161, gear box 187, crank 162, connecting link 163, lever 164, lever 165, and connecting link 191 (which is pivotally attached to connector 192, which connector is adjustably mounted on a rod 193 that is slidably mounted in journals 194, 195). Also included are universal joint 196 which allows for slight misalignment between rod 193 and telescoping rod 197, detent block 198, and reciprocal crosshead 47 (which drives the wood feed).

Figure 10:
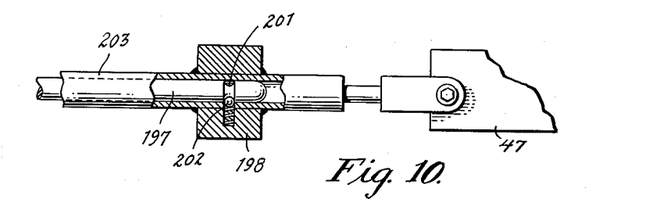
FIG. 10 is an enlarged view taken as indicated by the bracket X in FIG. 1.
Figure 11:
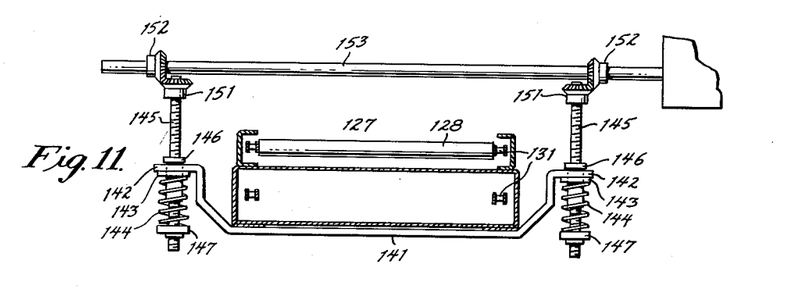
FIG. 11 is a view in section taken as indicated by the lines and arrows XI—XI in FIG. 1.

Referring to FIG. 10, telescoping rod 197 has a groove 201 formed therein, and detent block 198 has spring-loaded plungers positioned therein and extending into groove 201 so that telescoping tube 203 moves with rod 197 to reciprocate crosshead 47. This arrangement provides a safety feature so that if a board 28 should jam the mechanism, rod 197 separates from tube 203 to prevent damage to the apparatus.

Referring to FIG. 1, the conveyor drive means includes drive motor 161, gear box 187, shaft 211, universal joint 212, shaft 213, timing pulley 214, timing belt 215, timing pulley 216, universal joint 217, shaft 218, gear box 219, and conveyor chains 131.

In operation, a quantity of wooden boards 28 are stacked in board hopper 31, and a pair of boards 28 are fed to forming zone 32 where they are detachably held by board receiving means 34. A quantity of paper blanks 37 are stacked in paper hopper 36, and the bottom blank 37 is fed to a position beneath boards 28 in forming zone 32. During passage of blank 37 from paper hopper 36 to forming zone 32, an adhesive is applied to selected areas of blank 37 by adhesive applying means 41. Then boards 28 are moved into set-up position relative to blank 37 by mandrel 85 on its downward stroke. Walls 22—26, and connecting tabs 27, of the lug box 21 are cammed into set-up position by forming shoes and rods 93—97, and the adhesive surfaces of box 21 are compressed together by rollers 101—104 to aid in setting of the adhesive.

Then walls 23—26, and tabs 27, are held in position by cage plates 106—109 of cage 105 to prevent them from flowering outwardly while the adhesive is setting. The formed lug boxes 21 are passed to conveyor means 42 and transported thereby to delivery station 43.

While being transported by conveyor means 42, pusher bars 128 contact rear wall 26 near the bottom. Any upward force against lug box 21 is counteracted by the downward force exerted by board conveyor guides 134. Side conveyor guides 132 press inwardly against the outside of side walls 23, 24 and this inward pressure is counteracted by depending flanges 135 which contact the inner surface of boards 28.

At the exit end of conveyor means 42, formed lug boxes are delivered to a discharge chute 154. In order to prevent the formed lug box 21 from slipping backwardly on chute 154 to be caught and crushed by a following pusher bar 128, discharge springs 155 are mounted on board conveyor guides 134 and contact the top of boards 28 to hold the formed lug boxes in position against the surface of chute 154.

The lug box making machine constructed in accordance with this invention is completely adjustable to accommodate lug boxes of various sizes. In production, the machine works smoothly and produces more than fifteen boxes a minute.

In board hopper means 31, the slanted position of bottom board support 44 and side board support 45 results in better weight distribution of the boards 28. Additionally, this structure accommodates different size boards easily, and the operator can easily load both hoppers from one side of the machine.

The use of the machine of this invention has resulted in considerable savings. The raw material is of less cost, since paper is cheaper than the previously used all wood boxes. Moreover, the lug box made by the present invention is lighter in weight (thereby saving on shipping costs), and is smaller in size (thereby saving on storage costs).

Machines constructed in accordance with the present invention may be placed in the plant of the packer, thus enabling the packer to make lug boxes as he needs them. Accordingly, very little storage space is needed, whereas in the previously used wood boxes, a large volume of storage space was needed since the boxes were shipped to the packer in set-up condition.

It is to be noted that the lug box 21 is always constrained from the time it is formed in forming station 32 until it is delivered to delivery station 43.

It is to be understood that the form of the invention herewith shown and described is to be taken as a preferred embodiment. Various changes may be made in the shape, size and arrangement of parts. For example, equivalent elements may be substituted for those illustrated and described, parts may be reversed, and certain features of the invention may be utilized independently of the use of other features, all without departing from The claimed invention:

1. A machine for forming a lug box having bottom, side, front, and rear walls made of paper and side support walls made of wooden boards adhesively attached to the interior of said side walls, comprising board hopper means for holding a quantity of wooden boards, a forming station, board feed means for feeding a pair of the boards from said board hopper means to said forming station, board receiving means at said forming station for receiving and detachably holding said pair of boards, a paper hopper for holding a quantity of paper blanks in flat condition, paper feed means for feeding the paper from said paper hopper to said forming station and into position beneath said pair of boards, adhesive applying means positioned intermediate said paper hopper and said forming means for applying an adhesive to selected areas of said paper, forming means positioned at said forming station for placing said boards into set-up position in said box, for camming the sides of said box into set-up position, and for compressing the adhesive surfaces of the box together to aid in setting, conveyor means positioned beneath said forming station for receiving the formed lug boxes, said conveyor means comprising a conveyor passageway through which the boxes are transported, a conveyor pusher bar which contacts the rear wall of the lug box to move it along in the path of conveyor travel, spring-backed side conveyor guides for pressing the outside of the side walls of the lug box during its conveyor travel, and board conveyor guides mounted above the path of lug box travel and pressing downwardly on the top of the boards against the upward pressure exerted by said conveyor pusher bar, and pressing outwardly against the boards in opposition to the inward pressure exerted thereon by the side conveyor guides.

2. A machine for forming a lug box having bottom, side, front, and rear walls made of paper and side support walls made of wooden boards adhesively attached to the interior of said side walls, comprising board hopper means for holding a quantity of wooden boards, a forming station, board feed means for feeding a pair of the boards from said board hopper means to said forming station, board receiving means at said forming station for receiving and detachably holding said pair of boards, heating means positioned adjacent said receiving means for drying the surface of said boards, a paper hopper for holding a quantity of paper blanks in flat condition, paper feed means for feeding the paper from said paper hopper to said forming station and into position beneath said pair of boards, adhesive applying means positioned intermediate said paper hopper and said forming station for spraying an adhesive on selected areas of said paper, forming means positioned at said forming station for placing said boards into set-up position in said box, for camming the sides of said box into set-up position, and for compressing the adhesive surfaces of the box together to aid in setting, conveyor means positioned beneath said forming station for receiving the formed lug boxes, said conveyor means comprising a conveyor passageway through which the boxes are transported, a conveyor pusher bar which contacts the rear wall of the lug box to move it along in the path of conveyor travel, spring-backed side conveyor guides for pressing the outside of the side walls of the lug box during its conveyor travel, and board conveyor guides mounted above the path of lug box travel and pressing downwardly on the top of the boards against the upward pressure exerted by said conveyor pusher bar, and pressing outwardly against the boards in opposition to the inward pressure exerted thereon by the side conveyor guides.

3. In a machine for forming a lug box having bottom, side, front, and rear walls made of paper and side support walls made of wooden boards adhesively attached to the interior of said side walls, board hopper and feed means comprising a board hopper for holding a stack of wooden boards having a bottom board support slanting upwardly from the horizontal and a side board support extending at substantially right angles from said bottom board support so as to deliver said boards down an inclined plane whereby only a portion of the weight of the stack of boards rests on the bottom board support, the rest of said weight being supported by said side board support, a forming station, feed pusher means for pushing the bottom board in the hopper towards said forming station, a flapper plate hinged about a shaft and positioned beside the path of said board between said hopper and said forming station for erecting said board to upright position during its travel to the forming station, and flapper plate actuating means connected between said pusher means and said flapper plate for actuating said flapper plate to rock about its shaft and erect said board in response to movement of said pusher means.

4. In a machine for forming a lug box having bottom, side, front, and rear walls made of paper and side support walls made of wooden boards adhesively attached to the interior of said side walls, a forming station, feed pusher means for pushing the bottom board in the hopper towards said forming station, a hinged flapper plate positioned intermediate said hopper and said forming station for erecting said board to upright position during its travel to the forming station, and flapper plate actuating means connected between said pusher means and said flapper plate for actuating said flapper plate in response to movement of said pusher means, said flapper plate actuating means comprising a reciprocating crosshead which reciprocates beneath said board hopper, a cam block mounted on said crosshead and reciprocable therewith and having a feed pusher finger extending therefrom which pushes the bottom board towards said forming station, said cam block having a cam surface formed therein, a cam follower mounted in operative relationship with said cam surface, and connecting means operatively connected between said cam follower and said flapper plate so that said flapper plate is operated in response to movement of said cam follower.

5. In the machine defined in claim 4, said connecting means including a telescoping rod having a cam end portion and a flapper plate end portion, and a tension spring joining said two end portions of the rod together so that if a board should jam to prevent movement of said flapper plate end portion of the rod, said cam end portion of the rod is movable against the action of said tension spring, whereby the elements of the machine are protected from breakage or damage caused by the jamming of said board.

6. In a machine for forming a lug box having bottom, side, front, and rear walls made of paper and side support walls made of wooden boards adhesively attached to the interior of said side walls, with the side walls being adhesively attached to the front and rear walls by means of a tab which extends from one of said attached walls to the other, said machine having a forming station, board feed means for feeding a pair of boards to said forming station, a vertically reciprocable mandrel mounted in said forming station, receiving means at said forming station for receiving and detachably holding said boards beneath said mandrel, paper feed means for feeding a flat blank of said lug box paper into position in said forming station beneath said mandrel and said boards, the improvement comprising front, rear, and side forming shoes mounted in said forming station in the path of mandrel travel for camming the front, rear, and side walls of said lug box into set-up position, forming rods adjustably and fixedly mounted in said forming station in the path of mandrel travel for camming said tabs into set-up position, front, rear, and side rollers mounted beneath said shoes and cooperating with said mandrel to squeeze the adhesive portions of said lug box together, and front, rear, and side cage plates mounted beneath said rollers for contacting the walls of said lug box and holding it in set-up position to aid in setting the adhesive.

7. The machine defined in claim 6, wherein each of said side rollers is mounted on a side roller support bracket, said side roller support bracket being adjustably mounted on a cage support plate, said front and rear rollers being each mounted on a second support roller bracket, said second roller support bracket being adjustably mounted on one of said side roller support brackets, whereby the front and rear rollers may be adjusted relative to said side rollers by moving said second roller support brackets relative to said side roller support brackets, and the front, rear and side rollers may be adjusted relative to said cage support plates without disturbing the distance between said rollers by moving said side roller support brackets relative to said cage support plates.

8. In a machine for forming a lug box having bottom, side, front, and rear walls made of paper and side support walls made of wooden boards adhesively attached to the interior of said side walls, said machine having a forming station from which the formed lug boxes are delivered, conveyor means positioned beneath said forming station for receiving the formed lug boxes, said conveyor means comprising a conveyor passageway through which the boxes are transported, a conveyor pusher bar which contacts the rear wall of the lug box to move it along in the path of conveyor travel, spring-backed side conveyor guides for pressing the outside of the side walls of the lug box during its conveyor travel, and board conveyor guides mounted above the path of lug box travel and pressing downwardly on the top of the boards against the upward pressure exerted by said conveyor pusher bar, and pressing outwardly against the boards in opposition to the inward pressure exerted thereon by the side conveyor guides.

9. The machine defined in claim 8, wherein adjustable means are provided to adjustably position said side conveyor guides and board conveyor guides so as to accommodate lug boxes of various sizes.

10. In a machine for forming a lug box having bottom, side, front, and rear walls made of paper and side support walls made of wooden boards adhesively attached to the interior of said side walls, the improvement comprising a box forming station having forming means for forming the lug box into set-up condition, a cage beneath said forming means having cage plates for pressing against the walls of the formed lug box to prevent the walls from flowering outwardly while adhesive thereon is setting, conveyor means positioned below said cage for receiving and transporting the formed lug boxes, said conveyor means holding the formed box between upper and side conveyor guides and pushing said box with a conveyor pusher bar, a U-shaped bracket with horizontal flanges supporting said conveyor means in the bottom of the U, means supporting each of said flanges on a threaded rod so that rotation of said rods move said U-shaped bracket along the axis of said rods to raise or lower said conveyor means relative to said cage, and means connected to said rods for rotating said rods as desired.

11. The machine defined in claim 10, wherein preloaded compression springs are provided beneath said flanges to hold said conveyor means with substantial rigidity but to allow some give to prevent damage to the machine if an operator should misalign said conveyor means relative to said cage by positioning them too close together for the size lug box being run.

12. A method of forming a lug box having bottom, side, front, and rear walls made of paper and side support walls made of wooden boards adhesively attached to the interior of said walls, comprising stacking a quantity of wooden boards in a board hopper zone, feeding a pair of said boards to a forming zone, detachably holding said boards at said forming zone, stacking a quantity of scored paper lug box blanks in flat condition in a paper hopper zone, feeding one of said blanks to a position beneath said boards in said forming zone, applying an adhesive to selected areas of said blank during its travel from the paper hopper zone to said forming zone, moving said boards into set-up position relative to said blank, camming the sides of said blank into set-up position, compressing the adhesive surfaces of the box together to aid in setting, pushing against the rear wall of the lug box near its bottom to move the lug box through a conveyor zone, pressing inwardly against the outside of the side walls of the lug box to aid in setting the adhesive, opposing the inwardly directed forces on the side walls by maintaining a fixed force which contacts the inside of said wooden boards so that the boards are maintained in an upright position, and opposing any upward force due to the pushing force on the bottom of the rear wall by maintaining a fixed force against the top of said board to prevent the lug box from rising upwardly out of the desired path through the conveyor zone.

13. A method of forming a lug box having bottom, side, front, and rear walls made of paper and side support walls made of wooden boards adhesively attached to the interior of said walls, comprising stacking a quantity of wooden boards in a board hopper zone, feeding a pair of said boards to a forming zone, detachably holding said boards at said forming zone, stacking a quantity of scored paper lug box blanks in flat condition in a paper hopper zone, feeding one of said blanks to a position beneath said boards in said forming zone, applying an adhesive to selected areas of said blank during its travel from the paper hopper zone to said forming zone, moving said boards into set-up position relative to said blank, camming the sides of said blank into set-up position, compressing the adhesive surfaces of the box together to aid in setting, holding the walls of the box in a cage zone to prevent them from flowering outwardly while the adhesive is setting, passing the formed lug boxes to a conveyor zone for transporting the formed lug boxes to a delivery zone, pushing against the rear wall of the lug box near its bottom to move the lug box through the conveyor zone, pressing inwardly against the outside of the side walls of the lug box to aid in setting the adhesive, opposing the inwardly directed forces on the side walls by maintaining a fixed force which contacts the inside of said wooden boards so that the boards are maintained in an upright position, and opposing any upward force due to the pushing force on the bottom of the rear wall by maintaining a fixed force against the top of said board to prevent the lug box from rising upwardly out of the desired path through the conveyor zone, receiving said formed lug boxes in the delivery zone, and resiliently contacting the top of said boards to hold said lug boxes in position in said delivery zone and prevent them from sliding backwardly.

14. A method of forming a lug box having bottom, side, front, and rear walls made of paper and side support walls made of wooden boards adhesively attached to the interior of said walls, comprising stacking a quantity of wooden boards in a board hopper zone, feeding a pair of said boards to a forming zone, detachably holding said boards at said forming zone, stacking a quantity of scored paper lug box blanks in flat condition in a paper hopper zone, feeding one of said blanks to a position beneath said boards in said forming zone, applying an adhesive to selected areas of said blank during its travel from the paper hopper zone to said forming zone, pushing against the rear wall of the lug box near its bottom to move the lug box through the conveyor zone, pressing inwardly against the outside of the side walls of the lug box to aid in setting the adhesive, opposing the inwardly directed forces on the side walls by maintaining a fixed force which contacts the inside of said wooden boards so that the boards are maintained in an upright position, and opposing any upward force due to the pushing force on the bottom of the rear wall by maintaining a fixed forces against the top of said board to prevent the lug box from rising upwardly out of the desired path through the conveyor zone.

15. In a machine for forming a lug box having bottom, side, front, and rear walls made of paper and side support walls made of wooden boards adhesively attached to the interior of said side walls, said machine having a forming station from which the formed lug boxes are delivered, conveyor means positioned beneath said forming station for receiving the formed lug boxes, said conveyor means comprising a conveyor passageway through which the boxes are transported, a conveyor pusher bar which contacts the rear wall of the lug box to move it along in the path of conveyor travel, spring-backed side conveyor guides for pressing against the outside of the side walls of the lug box during its conveyor travel, board conveyor guides mounted above the path of lug box travel and pressing downwardly on the top of the boards against the upward pressure exerted by said conveyor pusher bar, a discharge chute positioned at the exit end of said conveyor passageway and adapted to receive said lug boxes, and spring means mounted on said board conveyor guides for contacting the top of said boards when the lug boxes are received by said discharge chute to hold the lug box in position on said discharge chute and prevent it from sliding backwardly to be caught and crushed by a following conveyor pusher bar.

16. In a machine for forming a lug box having bottom, side, front, and rear walls made of paper and side support walls made of wooden boards adhesively attached to the interior of said side walls, said machine having a forming station, and board feed means for feeding a pair of the boards to said forming station, the improvement comprising board receiving means including a board-holding plate, a spring clip mounted on said board-holding plate and having a free end which detachably holds the board between said free end and said plate, an entrance guideway in the path of said board as it advances toward said clip and board-holding plate, an adjustable stop mounted on the far side of said clip and board-holding plate and having a spring which urges said stop in the direction toward said board, said stop spring being compressed by the board as the board is pushed too far forwardly, said spring-backed stop then returning to normal position and pushing said board rearwardly to its proper horizontal position while it is being held by said clip and board-holding plate.

References Cited in the file of this patent

UNITED STATES PATENTS

| | | |
|---|---|---|
| 1,021,703 | Quinlan | Mar. 26, 1912 |
| 1,131,161 | Root | Mar. 9, 1915 |
| 1,345,454 | Mascart | July 6, 1920 |
| 1,798,834 | Campen | Mar. 31, 1931 |
| 2,270,212 | Chaffin | Jan. 13, 1942 |
| 2,293,142 | Johnson | Aug. 18, 1942 |
| 2,430,620 | Sandberg | Nov. 11, 1947 |
| 2,837,013 | Pogendarm | June 3, 1958 |
| 2,867,158 | Andresen et al. | June 6, 1959 |
| 2,921,506 | Johnson | Jan. 19, 1960 |